C. B. WANAMAKER.
COLLAPSIBLE STAND.
APPLICATION FILED OCT. 14, 1912.
1,171,568. Patented Feb. 15, 1916.
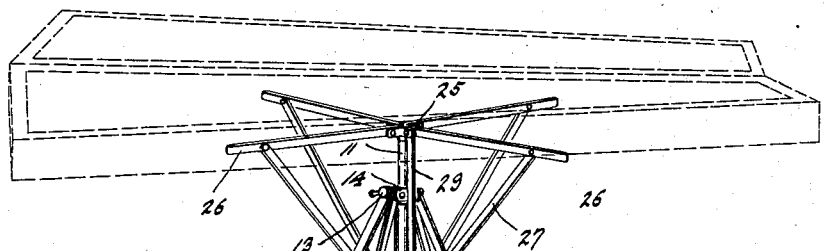
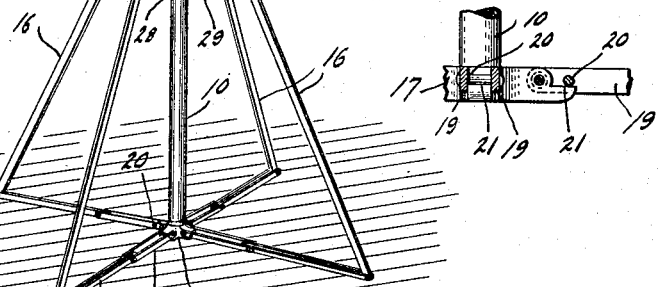
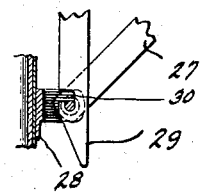
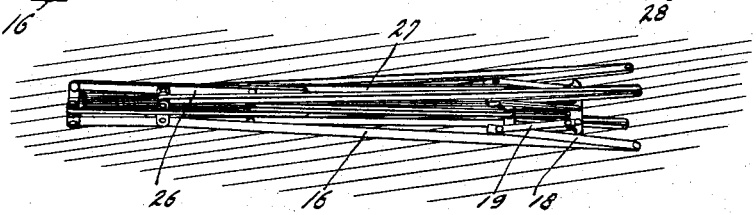
Witnesses
Inventor
Charles B. Wanamaker,
By
Arthur M. Hood
Attorney
THE COLUMBIA PLANOGRAPH CO., WASHINGTON, D. C.

UNITED STATES PATENT OFFICE.

CHARLES B. WANAMAKER, OF INDIANAPOLIS, INDIANA, ASSIGNOR TO LEEDY MANUFACTURING COMPANY, OF INDIANAPOLIS, INDIANA, A CORPORATION OF INDIANA.

COLLAPSIBLE STAND.

1,171,568.   Specification of Letters Patent.   Patented Feb. 15, 1916.

Application filed October 14, 1912. Serial No. 725,701.

*To all whom it may concern:*

Be it known that I, CHARLES B. WANAMAKER, a citizen of the United States, residing at Indianapolis, in the county of Marion and State of Indiana, have invented a new and useful Collapsible Stand, of which the following is a specification.

It is the object of my invention to provide a collapsible and adjustable stand, particularly adapted for use as a support for orchestra bells, xylophones, and other orchestral instruments.

The accompanying drawings illustrate my invention.

Figure 1 is a perspective view showing the stand open, and supporting a set of orchestra bells shown in outline; Fig. 2 is a perspective view showing the stand collapsed; Fig. 3 is a cross section showing the clamping device for the two sections of the upright; Fig. 4 is a detail of the locking device for the upper arms; and Fig. 5 is a detail of the attachment of one of the toggle links to the lower end of the upright.

The upright comprises two telescoping members 10 and 11, the upper end of the outer member 10 being split at 12, as shown in Fig. 3, and provided with a clamp 13 for clamping the two members 10 and 11 together in any desired position to prevent relative movement between them. The clamp 13 forms part of a fitting 14 fixed to the upper end of the section 10 and provided with a plurality of bifurcated projections 15 between the bifurcations of which are pivoted the legs 16. The legs 16, shown as four in number, are somewhat longer than the section 10, and the lower end of each leg is connected to a fitting 17 at the base of such section by means of a toggle comprising two links 18 and 19. The links 18 are substantially as much longer than the links 19 as the legs 16 are longer than the section 10, so that when a toggle is collapsed the corresponding leg 16 is bent down substantially parallel to the section 10; and the sum of two coöperating links 18 and 19 is such that when such links are extended they form one side of a right-angle triangle of which the section 10 forms the other side and the leg 16 the hypotenuse. Each link 19 is provided with a pin 20 which coöperates with a shoulder 21 on the fitting 17 to prevent the toggle from being broken downward.

On the upper end of the section 11 is fixed a fitting 25, on which are pivotally mounted a plurality of arms 26, shown as four in number. A link 27 is pivotally attached to each arm 26 and to a fitting 28 slidably mounted on the section 10 between the two fittings 14 and 17. By sliding the fitting 28 along the section 10 relatively to the fitting 25, the arms 26 may be swung either substantially parallel to the upright or into a plane at right angles thereto. When in the latter position, they form a support, on which may be placed anything desired; particularly a set of orchestra bells or other orchestral instrument. In order to keep the arms 26 from swinging downward, a locking bar 29 is pivoted at one end to the fitting 25, conveniently on the pivot on which one of the arms 26 is mounted, and is provided at the other end with a notch 30 which coöperates with a pin, conveniently the pivot pin for one of the links 27, on the fitting 28. The notch 30 is substantially L-shaped, so that after it is placed over the pin in the fitting 28 such fitting may be pushed downward slightly, thus locking the bar against swinging outward. By reason of this locking bar, the section 11 may be adjusted in the section 10 without disturbing the arms 26 of the instrument supported thereon.

I claim as my invention:

1. In a folding stand, the combination of two longitudinally telescoping members, a plurality of arms pivotally connected to the inner of said members, a collar mounted on the outer of said members and movable longitudinally thereon, a plurality of links connecting said collar with said arms, and a rigid member releasably connecting said collar and the inner of said members in definite longitudinal relationship whereby when the collar is slid along the outer member the inner member slides with it.

2. In a folding stand, the combination of two longitudinally telescoping members, a plurality of arms pivotally connected to the inner of said members, a collar mounted on the outer of said members, a plurality of links connecting said collar with said arms, and a rigid member releasably connecting said collar and the inner of said members in definite longitudinal relationship.

3. In a folding stand, a tubular member, an inner member telescoping with said tubular member, a folding base attached to said tubular member at two longitudinally spaced points thereon, a collar on said tubular member and located between said two longitudinally spaced points, and a folding top carried partly by said collar and partly on said inner member, said collar being longitudinally movable on said tubular member.

4. In a folding stand, a tubular member, a plurality of arms pivotally mounted on said tubular member at a fixed point longitudinally thereof, a second plurality of arms pivotally mounted on said tubular member at a different fixed point longitudinally thereof and shorter than the first plurality of arms, a plurality of links connecting the arms of said first plurality of arms with the arms of the second plurality of arms, an inner member telescopingly mounted in said tubular member, a plurality of arms hinged on said inner member, a collar slidably mounted on said tubular member between the points where the first and second pluralities of arms are mounted, and links connecting said collar with the arms pivotally mounted on said inner member.

5. In a folding stand, a tubular member, a plurality of arms pivotally mounted on said tubular member at a fixed point longitudinally thereof, a second plurality of arms pivotally mounted on said tubular member at a different fixed point longitudinally thereof and shorter than the first plurality of arms, a plurality of links connecting the arms of said first plurality of arms with the arms of the second plurality of arms, an inner member telescopingly mounted in said tubular member, a plurality of arms hinged on said inner member, a collar slidably mounted on said tubular member between the points where the first and second pluralities of arms are mounted, links connecting said collar with the arms pivotally mounted on said inner member, and a rigid connecting member for connecting said collar and said inner member so that they may be made to slide together relatively to said tubular member.

6. In a folding stand, two longitudinally telescoping members, a folding base attached to the outer member at two longitudinally spaced points thereon, and a folding top supported both on the outer member at an intermediate point between said first two points and on the projecting part of said inner member.

7. In a folding stand, a body member, a plurality of arms pivotally mounted in said body member at a fixed point longitudinally thereof, a second plurality of arms pivotally mounted on said body member at a different fixed point longitudinally thereof, the arms of the second plurality of arms being shorter than those of the first plurality of arms, and a plurality of links each pivoted at one end to one of the arms of the first plurality of arms and at the other end to one of the arms of the second plurality of arms.

8. In a folding stand, a tubular member, a folding base attached to said tubular member at two spaced but relatively fixed points thereon, an inner member telescopingly mounted in said tubular member, a collar slidably mounted on said tubular member between said two fixed points, and a folding top mounted on said collar and said inner member.

9. In a folding stand, a tubular member, a folding base attached to said tubular member at two spaced but relatively fixed points thereon, an inner member telescopingly mounted in said tubular member, a collar slidably mounted on said tubular member between said two fixed points, a folding top mounted on said collar and said inner member, and a rigid connecting member for connecting said collar and said inner member so that they may be made to slide together relatively to said tubular member.

In witness whereof I have hereunto set my hand and seal at Indianapolis, Indiana, this 5th day of September, A. D. one thousand nine hundred and twelve.

CHARLES B. WANAMAKER. [L. S.]

Witnesses:
MAPLE MYERS,
G. B. SCHLEY.

Copies of this patent may be obtained for five cents each, by addressing the "Commissioner of Patents, Washington, D. C."